US012560886B2

(12) United States Patent
Nakane

(10) Patent No.: US 12,560,886 B2
(45) Date of Patent: Feb. 24, 2026

(54) CHARGE REMOVING APPARATUS OF SHEET IN IMAGE FORMING APPARATUS, METHOD OF CONTROLLING THE SAME, AND STORAGE MEDIUM

(71) Applicant: CANON KABUSHIKI KAISHA, Tokyo (JP)

(72) Inventor: Hiroyuki Nakane, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/768,877

(22) Filed: Jul. 10, 2024

(65) Prior Publication Data

US 2025/0021043 A1 Jan. 16, 2025

(30) Foreign Application Priority Data

Jul. 10, 2023 (JP) ................................ 2023-112823

(51) Int. Cl.

*G03G 21/06* (2006.01)
*G03G 15/00* (2006.01)
*G03G 15/02* (2006.01)

(52) U.S. Cl.

CPC ......... *G03G 21/06* (2013.01); *G03G 15/0266* (2013.01); *G03G 15/6573* (2013.01); *G03G 2221/0005* (2013.01)

(58) Field of Classification Search

CPC ............... G03G 15/6573; G03G 15/55; G03G 15/0266; G03G 15/50

See application file for complete search history.

(56) References Cited

U.S. PATENT DOCUMENTS

2014/0003828 A1* 1/2014 Araki ................ G03G 15/0266 399/50
2020/0233339 A1* 7/2020 Cohen ................. G03G 15/104
2021/0216027 A1* 7/2021 Tanaka .............. G03G 15/6573

FOREIGN PATENT DOCUMENTS

JP H11258881 A 9/1999

* cited by examiner

*Primary Examiner* — Jessica L Eley
(74) *Attorney, Agent, or Firm* — Canon U.S.A., Inc. IP Division

(57) ABSTRACT

An application voltage value optimum for a toner use amount or an area of a region where toner is applied is to be set to avoid sticking of sheets. A method of controlling an image forming apparatus includes receiving a print job, performing print processing on a sheet based on the print job, and performing charge removing processing of the sheet based on a charge amount calculated from image data on a page of the print job.

7 Claims, 16 Drawing Sheets

CHARGE REMOVING APPARATUS OF SHEET IN IMAGE FORMING APPARATUS, METHOD OF CONTROLLING THE SAME, AND STORAGE MEDIUM

BACKGROUND

Field of the Disclosure

The present disclosure relates to an image forming apparatus, a method of controlling the image forming apparatus, and a storage medium.

Description of the Related Art

A recording medium (hereinafter, referred to as a "sheet") used for printing work is conveyed while being charged with static electricity by remaining charges in an electrophotographic process or slight friction against a conveyance roller and a guide occurred during conveyance of the sheet. The static electricity may cause sticking of sheets. In addition, the static electricity causes sticking of dust and paper powder to a resulting document, which deteriorates the quality of the resulting document.

A sheet of plain paper has low electric resistance, and charges easily move in the paper. Thus, a charge amount is also small, and the charges are rapidly eliminated. Further, a toner layer on the sheet acts as a resistance. Thus, even for the same sheet type, the charge amount is increased as a toner use amount is increased, and the charges easily remain. In the case of duplex printing, charge transfer hardly occurs in the paper since toner layers are formed on front and back surfaces of the sheet. As a result, the sheet is easily charged as a toner amount on the sheet is increased, and the charges easily remain.

If post-processing is performed in a state where sheets are stuck to each other, sheet alignment processing is affected, which may deteriorate quality of the post-processing and may induce jamming during the post-processing.

Therefore, to prevent occurrence of such risks, it is desirable to remove static electricity from the sheet after a printing process and before execution of the post-processing. A technique for offsetting the charges on the sheet by applying a voltage to a conveyance roller pair positioned downstream in a sheet conveyance direction has been discussed (Japanese Patent Application Laid-Open No. H11-258881). In charge removal by using a configuration in which a voltage is applied to a conveyance roller (hereinafter, referred to as "charge removing roller"), charges in opposite-polarity to the charges of the sheet are applied to the sheet via the charge removing roller, thereby offsetting static electricity. Therefore, it is necessary to perform charge removing control by the charge removing roller, i.e., application of charges in opposite-polarity to charges of a sheet, to a charge removing roller based on the charge amount of the sheet. Further, for each print environment, such as humidity, and each sheet type, an optimum charge adjustment value for charge removal is present. If the charge removing control is performed on the sheet in a state of unsuitable charge adjustment, the sheet may be conversely charged, which may cause further sticking of the sheets.

In a process of finding an optimum application voltage value for charge removal (hereinafter, referred to as an adjustment process), the optimum application voltage value for charge removal for the sheet conveyed from a printing apparatus is determined by setting and adjusting the application voltage value by a charge removing apparatus including the charge removing roller. The application voltage value determined in the adjustment process is the application voltage value optimum for the print environment and the sheet type used in the print process.

However, in a region where toner is applied in a job actually input by a user, a toner layer acts as resistance. Thus, the application voltage value may not be optimum depending on a toner use amount and an area of the region where the toner is applied, which may lead to sticking of the sheets. In addition, while the job input by the user can be used in the adjustment process, the adjustment process is to be performed every time a job is input, which requires time and effort. Further, in a case where the job includes a plurality of pages, the optimum application voltage value may vary depending on a page, which may also lead to sticking of the sheets.

SUMMARY

To solve the above-described issues, some embodiments have the following configuration. According to an aspect of the present disclosure, an image forming apparatus includes an interface configured to receive a print job, a printer unit configured to perform print processing on a sheet based on the print job, and a charge removing apparatus configured to perform charge removing processing of the sheet based on a charge amount calculated from image data on a page of the print job.

Further features of various embodiments will become apparent from the following description of exemplary embodiments with reference to the attached drawings.

DESCRIPTION OF THE EMBODIMENTS

Some exemplary embodiments of the present disclosure are described in detail below with reference to the drawings. Components described in the exemplary embodiments are illustrative, and the scopes of some embodiments are not limited to the components.

Entire Configuration

Figure 1:
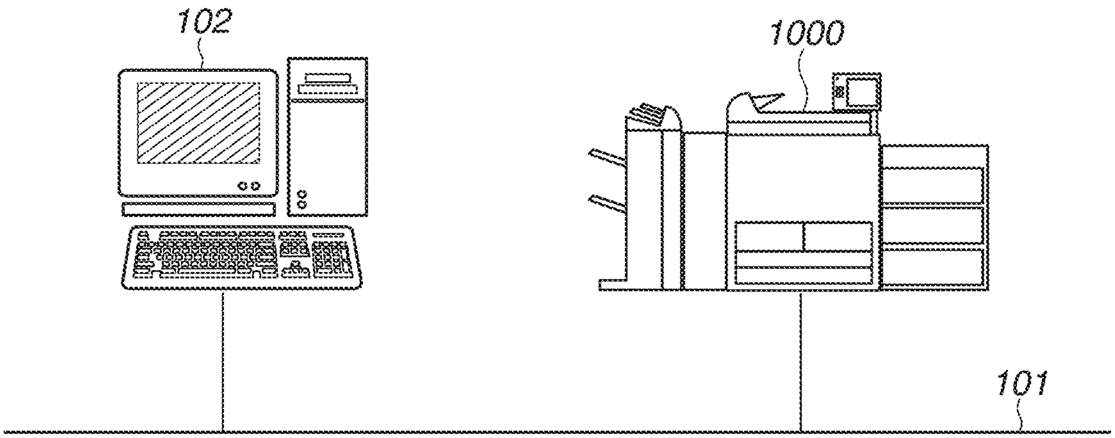
FIG. 1 is a configuration diagram illustrating a minimum system according to exemplary embodiments.

FIG. 1 illustrates a simple entire configuration according to a first exemplary embodiment. An image forming apparatus 1000 and a client computer 102 (hereinafter, referred to as the PC 102) are provided and are connected via a network 101. The PC 102 can transmit page description language (PDL) code data as a print job to the image forming apparatus 1000 via the network 101.

Hardware Configuration of Image Forming Apparatus

Figure 2:
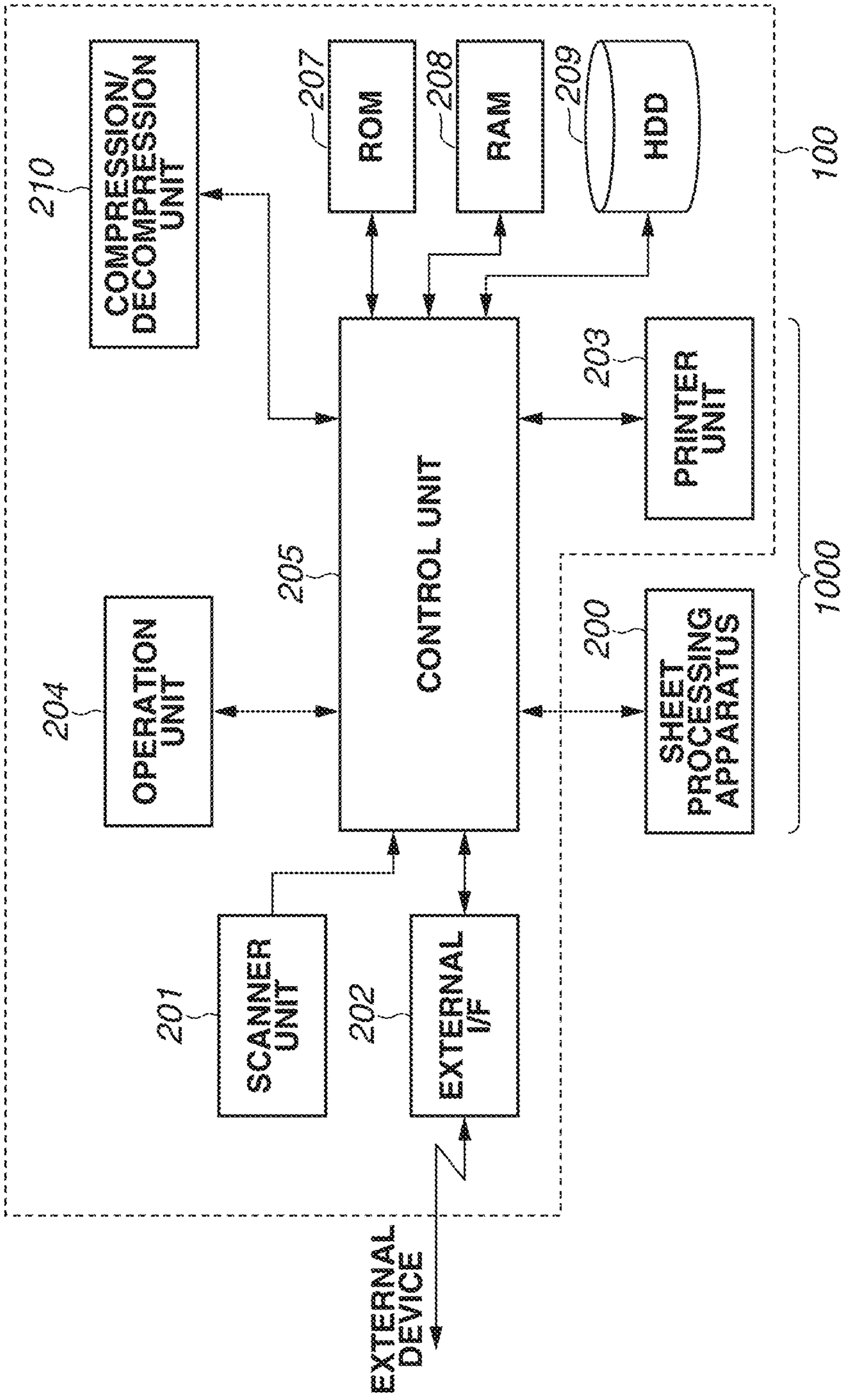
FIG. 2 is a hardware block diagram of a printing apparatus.

The image forming apparatus 1000 is described with reference to a hardware block diagram in FIG. 2. The image forming apparatus 1000 includes a printing apparatus 100, which is surrounded by a dotted line in the drawing, and a sheet processing apparatus 200. Any number of sheet processing apparatuses 200 can be connected to the printing apparatus 100. In the present exemplary embodiment, as the printing apparatus 100, a multifunctional peripheral (MFP) having a plurality of functions, such as a copy function and a printer function, is described as an example. However, the printing apparatus 100 may be a single-function printing apparatus having only a copy function or a printer function. In the present exemplary embodiment, as an example, the image forming apparatus 1000 includes various kinds of components described below.

The image forming apparatus 1000 is configured such that the sheet processing apparatus 200 connected to the printing apparatus 100 can perform sheet processing on a sheet printed by the printing apparatus 100. However, the image forming apparatus 1000 may include only the printing apparatus 100 without the sheet processing apparatus 200 being connected.

The sheet processing apparatus 200 is configured to be communicable with the printing apparatus 100 and can perform the sheet processing described below in response to an instruction from the printing apparatus 100.

A scanner unit 201 reads an image on a document, converts the read image into image data, and transfers the image data to another unit.

An external interface (I/F) 202 transmits and receives data to and from another apparatus connected to the network 101.

A printer unit 203 prints an image based on the input image data, on a sheet.

Figure 4:
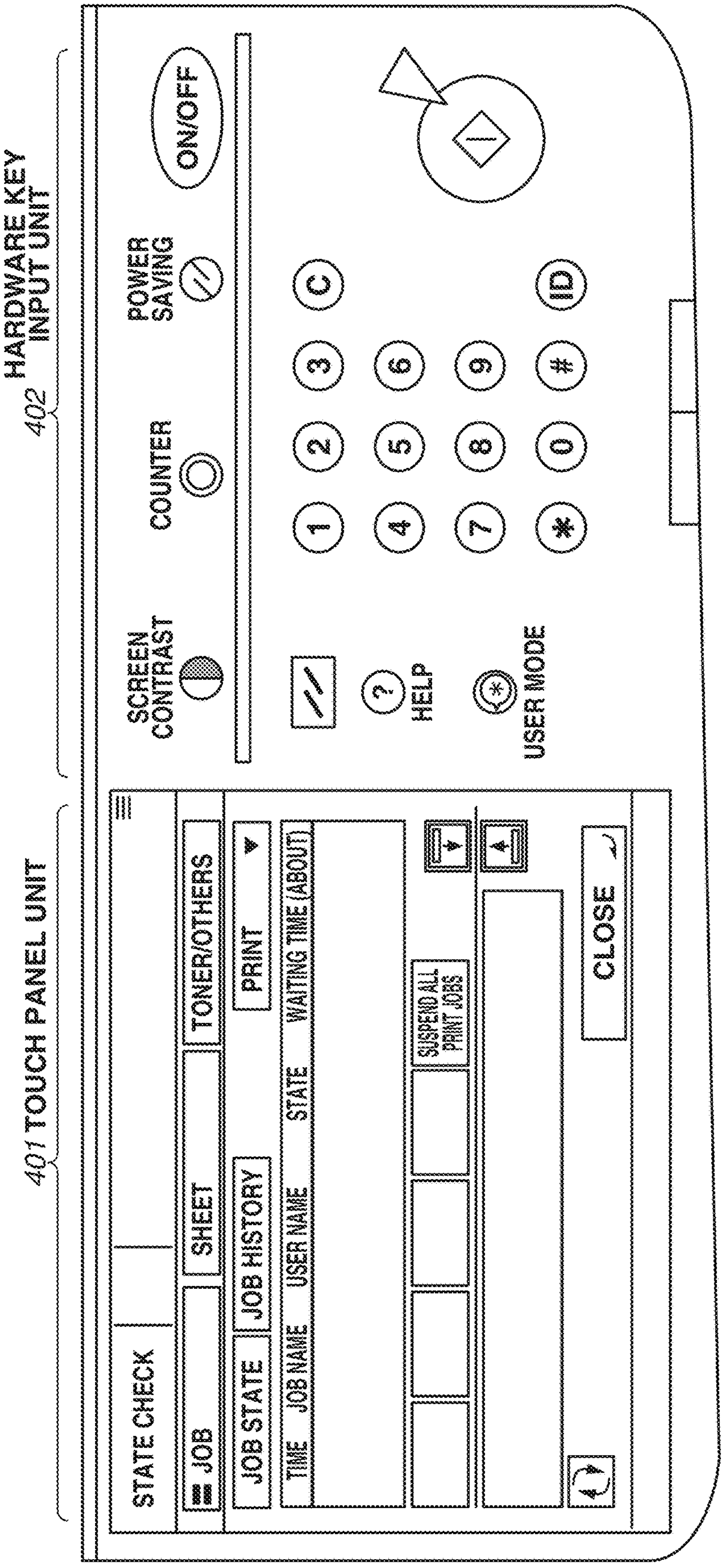
FIG. 4 is a diagram illustrating an operation unit included in the printing apparatus.

An operation unit 204 has a configuration as illustrated in FIG. 4. The operation unit 204 includes a hardware key input unit (key input unit) 402 and a touch panel unit 401, and receives an instruction from a user via these units. Further, the operation unit 204 performs various kinds of displays on the touch panel unit 401 of the operation unit 204.

A control unit 205 is a central processing unit (CPU), and totally controls processing, operation, and the like of various kinds of units of the image forming apparatus 1000. More specifically, the control unit 205 controls operation of the printing apparatus 100 and the sheet processing apparatus 200 connected to the printing apparatus 100.

A read only memory (ROM) 207 stores various kinds of computer programs to be executed by the control unit 205.

For example, the ROM 207 stores programs for causing the control unit 205 to perform various kinds of processing in flowcharts described below, and display control programs necessary for displaying various kinds of setting screens described below. The ROM 207 also stores programs for causing the control unit 205 to interpret the PDL code data received from the PC 102 and developing the PDL code data into raster image data (image data). In addition, the ROM 207 stores a boot sequence, font information, and the like.

A random access memory (RAM) 208 stores the image data and the PDL code data transmitted from the scanner unit 201 and the external I/F 202, various kinds of programs loaded from the ROM 207, and setting information. The RAM 208 also stores information about the sheet processing apparatus 200 (e.g., information about a type and a function of each sheet processing apparatus 200 connected to printing apparatus 100). The control unit 205 can use the information about the sheet processing apparatus 200 stored in the RAM 208, for control.

A hard disk drive (HDD) 209 includes a hard disk and a driving unit that performs reading and writing of data on the hard disk. The HDD 209 is a large-capacity storage device for storing scanned image data that is input from the scanner unit 201 and is compressed by a compression/decompression unit 210. The control unit 205 that is the CPU can print the image data stored in the HDD 209, by using the printer unit 203 based on an instruction from the user. Further, the HDD 209 is also used as a spooler, and the control unit 205 can manage and store the PDL code data received from the PC 102 as a print job in the HDD 209. Further, the control unit 205 that is the CPU can manage print jobs stored in the HDD 209, and can acquire the number of stored print jobs and setting information of each of the print jobs.

The compression/decompression unit 210 performs compression/decompression operation of the image data and the like stored in the RAM 208 and the HDD 209 by various kinds of compression schemes, such as Joint Bi-level Image Experts Group (JBIG) and Joint Photographic Experts Group (JPEG).

The HDD 209 stores in advance an application voltage value optimum for each sheet type, as a sheet parameter. The sheet parameter is a default value written as a recommended value for each sheet type when the printing apparatus 100 is shipped from a factory. When the user turns on a charge removing function and selects a sheet for printing, the application voltage value set to the selected sheet type is read from the HDD 209 and is applied. In a case where the application voltage value for the sheet determined in the adjustment process is received via the operation unit 204, the control unit 205 updates the sheet parameter corresponding to the sheet type, and stores the updated sheet parameter in the HDD 209.

Although described below, the control unit 205 calculates a toner use amount when an image is printed on a sheet based on the input image data or the image data stored in the HDD 209. Then, the control unit 205 further adjusts the application voltage value stored in the HDD 209 to be an optimum application voltage value based on the toner use amount.

(Cross-Sectional View of Image Forming Apparatus)

Figure 3:
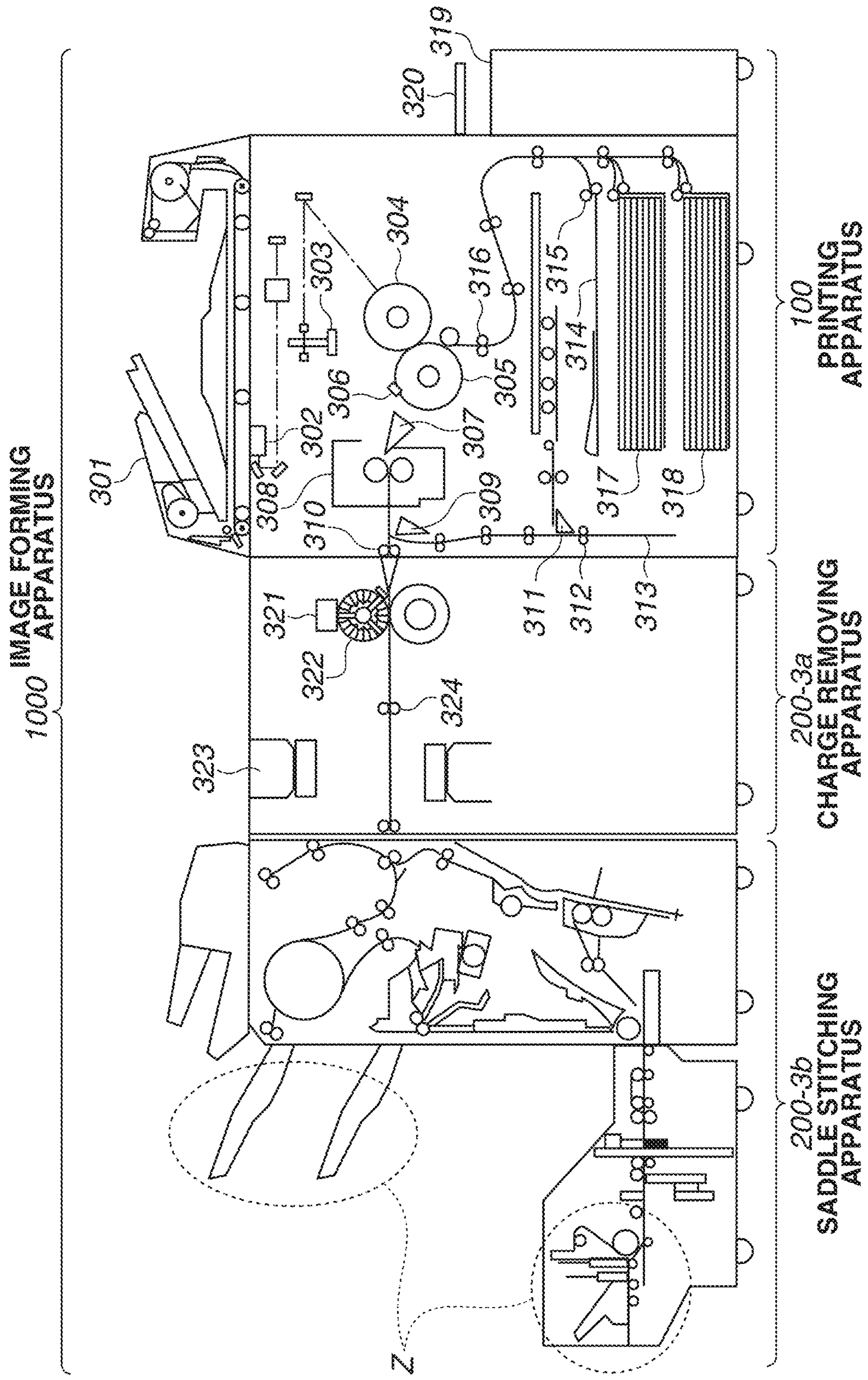
FIG. 3 is a cross-sectional view of an image forming apparatus.

Next, the configuration of the image forming apparatus 1000 is described with reference to FIG. 3. FIG. 3 is a cross-sectional view of the printing apparatus 100 and the sheet processing apparatus 200 connected to the printing apparatus 100. In FIG. 3, the sheet processing apparatus 200 includes a charge removing apparatus **200-3*a* and a saddle stitching apparatus 200-3*b***.

First, the printing apparatus 100 is described.

An automatic document feeder (ADF) 301 sequentially separates documents, in page order, from a first document of a bundle of documents set on a sheet stack surface of a document tray, and conveys each document onto a platen glass in order to scan the document with a scanner 302.

The scanner 302 reads an image of the document conveyed onto the platen glass, and converts the read image into image data with a charge-coupled device (CCD).

A rotary polygon mirror (e.g., polygon mirror) 303 receives a light ray, such as a laser beam, modulated based on the image data, and irradiates a photosensitive drum 304 with reflected scanning light via a reflection mirror.

A latent image formed on the photosensitive drum 304 using the laser beam is developed with toner, and a toner image is transferred to a sheet material adhered to a transfer drum 305. The above image formation process is sequentially performed on toner of yellow (Y), magenta (M), cyan (C), and black (K), thereby a full-color image is formed. After the image formation process is performed four times, the sheet material on which the full-color image has been formed on the transfer drum 305 is separated by a separation claw 306 and is conveyed to a fixing unit 308 by a pre-fixing conveyor 307.

The fixing unit 308 includes a combination of rollers and a belt, incorporates a heat source, such as a halogen heater, and fuses and fixes the toner on the sheet material on which the toner image has been transferred, by heat and pressure.

A sheet discharge flapper 309 is configured to be pivotable about a pivot shaft, and determines a conveyance direction of the sheet material. When the sheet discharge flapper 309 pivots in a clockwise direction in the drawing, the sheet material is straightly conveyed and is discharged to the outside of the printing apparatus 100 by discharge rollers 310. The control unit 205 controls the printing apparatus 100 to perform simplex printing by the above-described sequence.

In contrast, in a case where images are formed on both surfaces of the sheet material, the sheet discharge flapper 309 pivots in a counterclockwise direction in the drawing, a path of the sheet material is changed to a downward path, and the sheet material is delivered to a duplex conveyance unit.

The duplex conveyance unit includes a reverse flapper 311, reverse rollers 312, a reverse guide 313, and a duplex tray 314. The reverse flapper 311 pivots about a pivot shaft, and determines a conveyance direction of the sheet material. In a case of processing a duplex print job, the control unit 205 controls the reverse flapper 311 to pivot in the counterclockwise direction in the drawing, thereby delivering the sheet material whose first surface has been printed by the printer unit 203 to the reverse guide 313 via the reverse rollers 312. In a state where a trailing edge of the sheet material is pinched by the reverse rollers 312, the control unit 205 stops the reverse rollers 312 once, and then controls the reverse flapper 311 to pivot in the clockwise direction in the drawing. In addition, the control unit 205 rotates the reverse rollers 312 in the opposite direction.

The sheet material is accordingly switched back, and is guided to the duplex tray 314 in a state where positions of the trailing edge and a leading edge of the sheet material are switched around. The sheet material is once loaded onto the duplex tray 314, and is then delivered to registration rollers 316 again by re-feeding rollers 315. At this time, the sheet material is delivered in a state where a surface opposite to a surface in a first surface transfer process faces the photosensitive drum 304. Then, an image is formed on a second surface of the sheet material in a manner similar to the above-described process. The images are thus formed on both surfaces of the sheet material. The sheet material is subjected to a fixing process, and is then discharged from the inside of a main body of the printing apparatus 100 to the outside of the printing apparatus 100 by the discharge rollers 310. The control unit 205 controls the printing apparatus 100 to perform the duplex printing by the above-described sequence.

The printing apparatus 100 also includes a sheet feeding unit that houses sheets used for print processing. The sheet feeding unit includes sheet feeding cassettes 317 and 318 (e.g., each capable of housing 500 sheets), a sheet feeding deck 319 (e.g., capable of housing 5000 sheets), and a manual feeding tray 320. In the sheet feeding cassettes 317 and 318 and the sheet feeding deck 319, various kinds of sheets different in size and material can be set in distinction from each other in the sheet feeding units. In the manual feeding tray 320, various kinds of sheets including a special sheet, such as an overhead projector (OHP) sheet, can be set.

(Charge Removing Apparatus)

Figure 5:
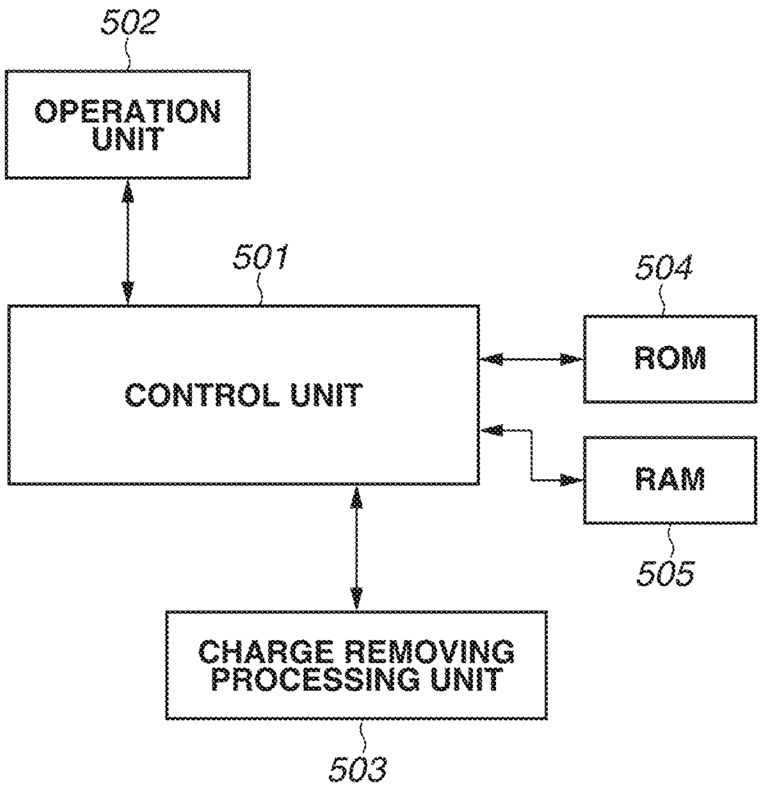
FIG. 5 is a hardware block diagram of a charge removing apparatus.

Next, the charge removing apparatus **200-3*a* is described. FIG. 5 is a hardware block diagram of the charge removing apparatus 200-3*a*. The charge removing apparatus 200-3*a* includes a control unit 501 different from the control unit 205 of the printing apparatus 100. The control unit 501 totally manages the whole of the charge removing apparatus 200-3*a* while communicating with the control unit 205 of the printing apparatus 100 illustrated in FIG. 2** via a bus (not illustrated).

Figure 6:
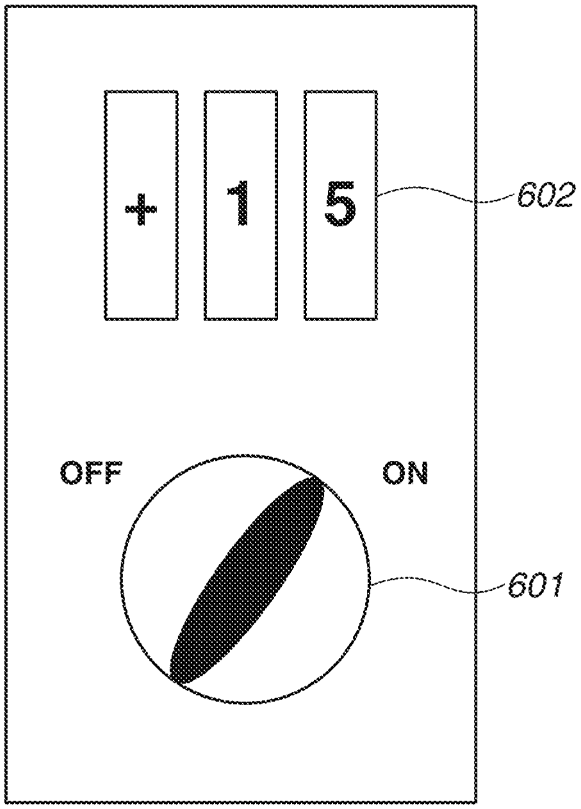
FIG. 6 is a diagram illustrating an operation unit included in the charge removing apparatus.

An operation unit 502 has a configuration as illustrated in FIG. 6. The user can perform setting of the charge removing apparatus **200-3*a* via the operation unit 502. A mode setting switch 601 illustrated in FIG. 6 is a switch for switching between performing and not performing charge removal by the charge removing apparatus 200-3*a* (ON and OFF of charge removal). The control unit 501 controls a charge removing processing unit 503 described below to perform charge removing processing only when the switch is ON. An adjustment dial 602 composed of thumb rotary switches adjusts the strength of charge removing control performed when the mode setting switch 601 is ON, and is controlled by the control unit 501 so as to be enabled only when the mode setting switch 601 is ON. The adjustment dial 602 is used to set a voltage value applied from a voltage application controller 321 to a charge removing roller 322, and a value from "00" to "99" is settable. For example, when the adjustment dial 602 is set to "10", an application voltage value of +1.0 [kV] is set. In a case where a maximum application voltage of the charge removing roller is +6.0 [kV], even when the adjustment dial 602 is set to any value between "61" and "99", the application voltage value is fixed to +6.0 [kV], and an application voltage greater than +6.0 [kV] cannot be set. Generally, after an application voltage value optimum for a sheet used in an environment is adjusted and derived using the adjustment dial 602, the optimum application voltage value is set to perform printing. A case where a charge amount of a sheet that has been charged to −6 [kV] at the time of transfer becomes 0 [kV] (charges are removed) by setting the application voltage value of +6 [kV] to the sheet in the adjustment process is described. First, the user sets the adjustment dial 602 to "60". Next, the voltage application controller 321 performs control to charge the charge removing roller 322 to +6 [kV], and performs the charge removing processing on the conveyed sheet. The optimum application voltage value varies depending on sheet characteristics and a use environment of the charge removing apparatus 200-3***a*. Thus, in a case where printing is performed on a sheet having a characteristic of being easily charged, the print processing is desirably started after the application voltage value is derived in the adjustment process before printing. In the present exemplary embodiment, as the components of the operation unit 502, the physical mode selection switch and the thumb rotary switches are described. Also, the touch panel unit 401 of the operation unit 204 may perform various kinds of display, switch between ON and OFF, and change the application voltage value, on a user interface (UI). In this case, the control unit 205 of the printing apparatus 100 communicates with the control unit 501 via a bus (not illustrated) and provides information input to the operation unit 204. The control unit 501 having received the information provides information necessary for the charge removing processing described below, to the charge removing processing unit 503.

The charge removing processing unit 503 includes the charge removing roller 322, an ionizer 323, and the voltage application controller 321, which are described below, and performs the charge removing processing on the conveyed sheet. The control unit 501 implements control of applying voltages to the charge removing roller 322 and the ionizer 323 via the voltage application controller 321.

A ROM 504 stores a boot program for the charge removing apparatus 200-3*a*, a control program for the operation unit 502, a charge removing processing program for the charge removing processing unit 503, and the like. The control unit 501 loads a necessary program from the ROM 504 into a RAM 505 and executes the program as necessary.

(Charge Removing Processing)

Figure 7:
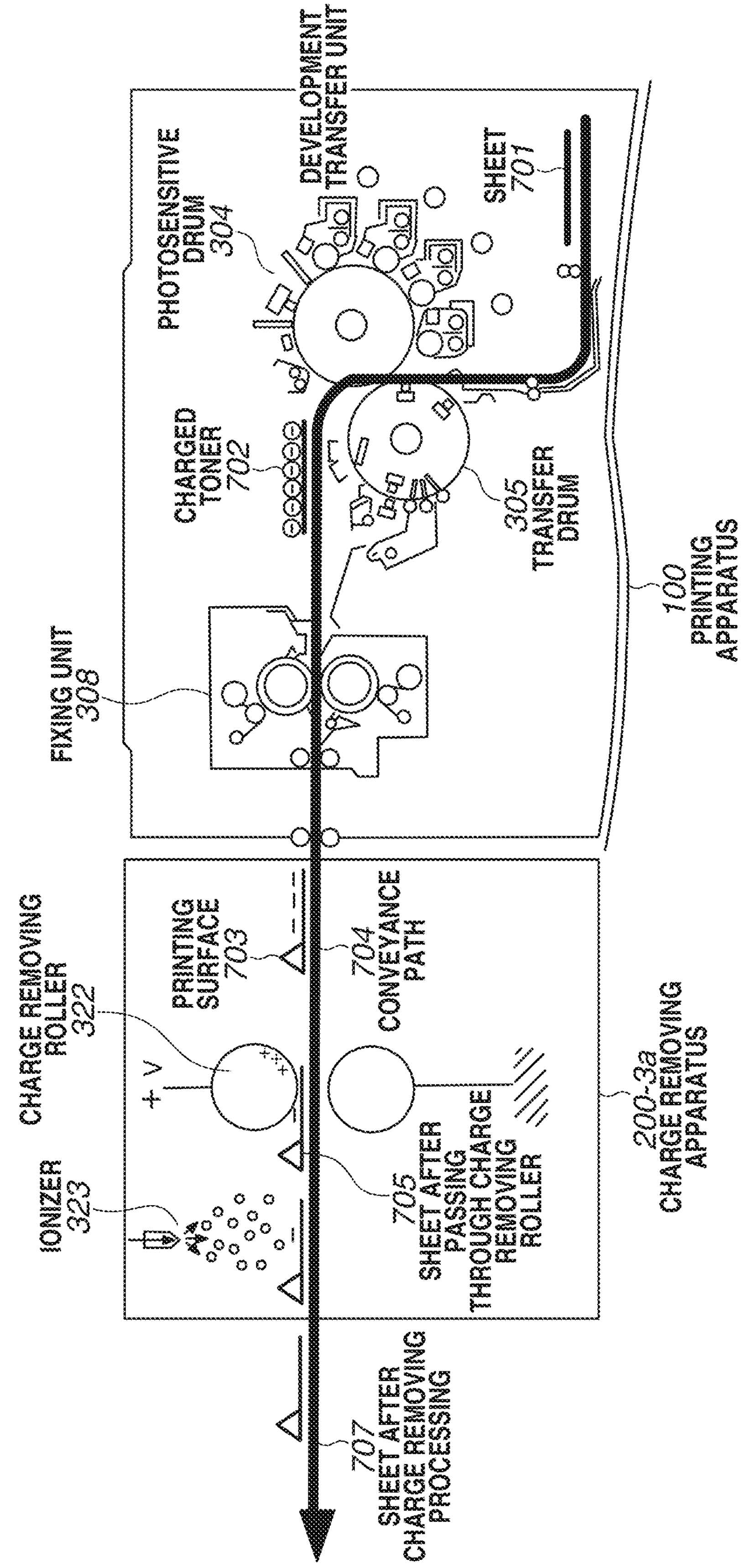
FIG. 7 is a schematic view illustrating charge removing processing.

An additional description of the charge removing processing performed by the charge removing processing unit 503 is provided herein with reference to FIG. 7. FIG. 7 is a diagram schematically illustrating a state where the charge removing processing by the charge removing apparatus 200-3*a* is performed on a sheet 701 subjected to the print processing by the printing apparatus 100.

First, the sheet 701 is conveyed to a development transfer unit including the photosensitive drum 304 and the transfer drum 305 via a conveyance path 704, and toner is applied to the sheet 701.

Charged toner 702 on the sheet 701 is negatively charged. The sheet 701 subjected to fixing by the fixing unit 308 is then conveyed to the charge removing apparatus 200-3*a* in a state where a printing surface 703 is negatively charged.

The charge removing apparatus 200-3*a* includes the charge removing roller 322 positively charged, and applies positive charges (application voltage value) to the printing surface 703, which is negatively charged, through contact charge removal by the roller, thereby eliminating the charged state. The charge removing roller 322 performs the charge removing processing using the application voltage value set by the control unit 501, and when the control unit 501 changes the charge amount in the middle of the charge removing processing of the sheet, the charge removing roller 322 changes the voltage applied to the sheet 701 in the middle of the processing. This makes it possible to change a charge removing effect among regions in one sheet. However, it is anticipated that the negative charges not removed in the charge removing processing by the charge removing roller 322 or positive charges conversely charged remain on a sheet 705 after passing through the charge removing roller 322. Thus, the charge removing apparatus 200-3*a* according to the present exemplary embodiment includes the ionizer 323 downstream of the charge removing roller 322. The ionizer 323 generates corona discharge by applying a voltage to an electrode needle provided in the ionizer 323, and eliminates charges by using ions generated by the corona discharge. In the above-described manner, the charge removing roller 322 performs rough charge removal, and the ionizer 323 eliminates remaining charges. As a result, a sheet 707 after the charge removing processing discharged from the charge removing apparatus 200-3*a* is in a state where charges are eliminated.

The description continues with reference to the cross-sectional view in FIG. 3. The charge removing apparatus 200-3*a* includes the charge removing roller 322 and a counterpart roller. The sheet conveyed to the charge removing apparatus 200-3*a* is conveyed while being pinched by both of the rollers, and is subjected to the above-described rough charge removal by the charge removing roller 322. Then, the sheet is subjected to the charge removing processing of the remaining charges by the ionizer 323 while being conveyed by conveyance rollers 324 to the outside of the charge removing apparatus 200-3*a*.

(Saddle Stitching Apparatus)

Then, the saddle stitching apparatus 200-3*b* is described. Examples of sheet processing performed by the saddle stitching apparatus 200-3*b* include saddle stitch binding, punch processing, cutting processing, shift discharge processing, folding processing, and staple processing. Hereinafter, a job subjected to the sheet processing is referred to as a "saddle stitch binding job".

In a case where the saddle stitch binding job is processed, the control unit 205 first conveys a sheet of the job printed by the printing apparatus 100 to the saddle stitching apparatus 200-3*b*, and then causes the saddle stitching apparatus 200-3*b* to perform the sheet processing of the job. Subsequently, the control unit 205 causes a sheet discharge destination Z of the saddle stitching apparatus 200-3*b* to hold a printed document of the saddle stitch binding job having been subjected to the sheet processing by the saddle stitching apparatus 200-3*b*. As the sheet discharge destination Z, there is a plurality of sheet discharge destination candidates. These candidates are used in a case where the saddle stitching apparatus 200-3*b* can perform a plurality of types of sheet processing and a sheet discharge destination is changed each time the sheet processing is performed. In the present exemplary embodiment, a description of a detailed conveyance procedure of the saddle stitch binding job is omitted.

Print Processing and Charge Removing Processing

Next, the print processing and the charge removing processing in the image forming apparatus 1000 according to the present exemplary embodiment are described with reference to a flowchart in FIG. 8. For illustrative purposes, a flow of processing for performing the print processing and the charge removing processing is described by using an image 900 illustrated in FIG. 9 as an example of the received print job. The image 900 is A4-size data, and the "image" herein refers to an image formed on each page of the print job before raster image processing (RIP).

In the present exemplary embodiment, printing of PDL data is described as the print job; however, the print job may be another job, such as a copy job.

The processing described below is implemented by the control unit 205 that is the CPU of the printing apparatus 100 loading a program stored in the ROM 207 or the HDD 209 into the RAM 208 and executing the program.

First, in step S801, the control unit 205 that is the CPU of the printing apparatus 100 acquires an ON/OFF state of the charge removing processing of the charge removing apparatus 200-3*a*. In step S801, the control unit 205 of the printing apparatus 100 transmits an inquiry to the control unit 501 that is the CPU of the charge removing apparatus 200-3*a*. The control unit 501 of the charge removing apparatus 200-3*a* acquires a state of the mode setting switch 601 of the operation unit 502 and an application voltage value set by the adjustment dial 602, and returns the state of the mode setting switch 601 and the set application voltage value to the control unit 205 of the printing apparatus 100.

Next, in step S802, the control unit 205 that is the CPU of the printing apparatus 100 displays the ON/OFF state of the charge removing processing of the charge removing apparatus 200-3*a* and the application voltage value acquired in step S801 on the operation unit 204 of the printing apparatus 100.

Subsequently, in step S803, the control unit 205 of the printing apparatus 100 determines whether a print job has been input. In a case where a print job has not been input (NO in step S803), the processing returns to step S801, and the control unit 205 continuously displays the ON/OFF state of the charge removing processing on the operation unit 204. On the other hand, in a case where a print job has been input (YES in step S803), the processing proceeds to step S804.

In step S804, the control unit 205 that is the CPU performs RIP processing by interpreting the image 900 as PDL data. The RIP processing is processing for converting PDL data into a raster image. Image data 911 to 913 illustrated in FIG. 9 each indicate an example of image data in which coordinate values of a pixel of the image 900 and gradation values (0 to 255) of cyan, magenta, yellow, black (CMYK) of the pixel have been converted into image data by the RIP processing.

For example, the image data 911 indicates that a pixel at coordinates (2500, 100) has colors of (C, M, Y, K)=(0, 0, 0, 0).

In step S805, the control unit 205 acquires the ON/OFF state of the charge removing processing of the charge removing apparatus 200-3*a* to determine the state of the charge removing processing. In a case where the charge removing processing is ON (YES in step S805), the processing proceeds to step S806. In a case where the charge removing processing is OFF (NO in step S805), the application voltage value is set to zero, and the processing proceeds to step S808.

(Calculation of Correction Value of Application Voltage Value: Step S806)

Figure 10:
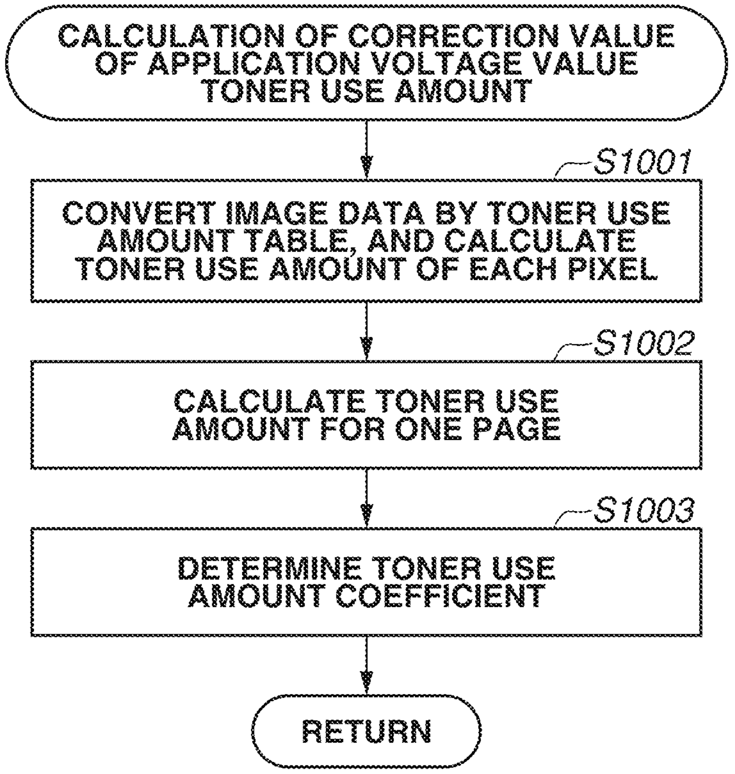
FIG. 10 is a flowchart for determining a toner use amount coefficient according to the exemplary embodiment.

Details of the processing in step S806 are described with reference to the flowchart in FIG. 10.

The processing in step S806 is processing for calculating a toner use amount necessary for printing, from the image data, and determining a coefficient to obtain an application voltage value suitable for the charge removing roller corresponding to the toner use amount, in order to derive the application voltage value optimum for the received image data.

In step S1001, the control unit 205 of the printing apparatus 100 converts image data on each pixel by using a toner use amount table, and calculates a toner use amount necessary for the pixel. The toner use amount table is a table for converting a density of each of CMYK into a toner amount.

Figure 9:
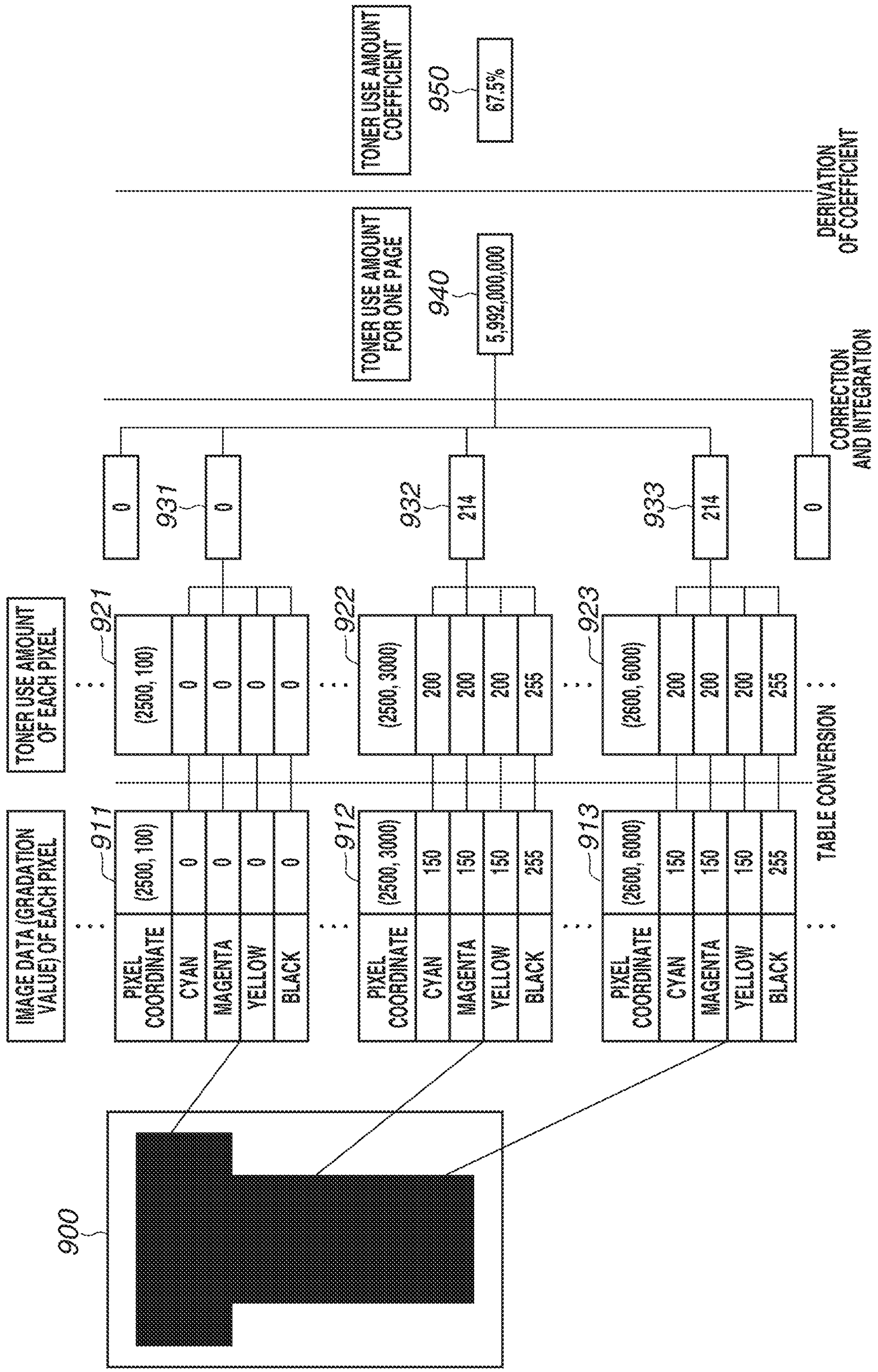
FIG. 9 illustrates an example of a print job for supplementation of the exemplary embodiment.

In the example illustrated in FIG. 9, toner use amount data 922 is derived from the image data 912 by a table conversion using the toner use amount table in step S1001. While the image data, the toner use amount data, and the toner use amount described below are present for each of all pixels in a page, in the present exemplary embodiment, the image data 911 to 913 are described as examples for illustrative purposes. The toner use amount data 922 indicates that toner amounts (0 to 255) of (C, M, Y, K)=(200, 200, 200, 255) are necessary for the pixel at coordinates (2500, 3000). Further, a value that represents all toner amounts necessary for the pixel by a value range of 0 to 255 is calculated as the toner use amount. In the case of the toner use amount data 922, a toner use amount 932 is calculated as 214 from (200+200+200+255)/(255+255+255+255)×255=214. When calculation is similarly performed on toner use amount data 921 and 923, a toner use amount 931 is zero, and a toner use amount 933 is 214.

In step S1002, the control unit 205 accumulates the calculated toner use amounts to calculate toner use amount for one page.

In the present exemplary embodiment, a toner use amount 940 for one page illustrated in FIG. 9 is specifically calculated.

When a colored area of the image 900 is 4000×7000=28,000,000 and the toner use amount per one pixel is 214, the toner use amount 940 for one page is calculated as 28,000,000×214=5,992,000,000.

In step S1003, the control unit 205 determines a toner use amount coefficient 950 from the toner use amount 940 for one page. The toner use amount coefficient 950 is a coefficient for performing correction by the toner use amount, on the currently-set application voltage value.

More specifically, a coefficient is derived when a coefficient in a case where toner is applied to the entire sheet is defined as 100%. The image 900 is in A4 size, and the maximum value of the toner use amount is 255. Thus, the number of pixels on the entire sheet is 4960×7015, the maximum toner use amount for the sheet is 4960×7015×255=8,872,572,000, and the toner use amount coefficient 950 is calculated as 5,992,000,000/8,872,572,000×100=67.5%.

Figure 8:
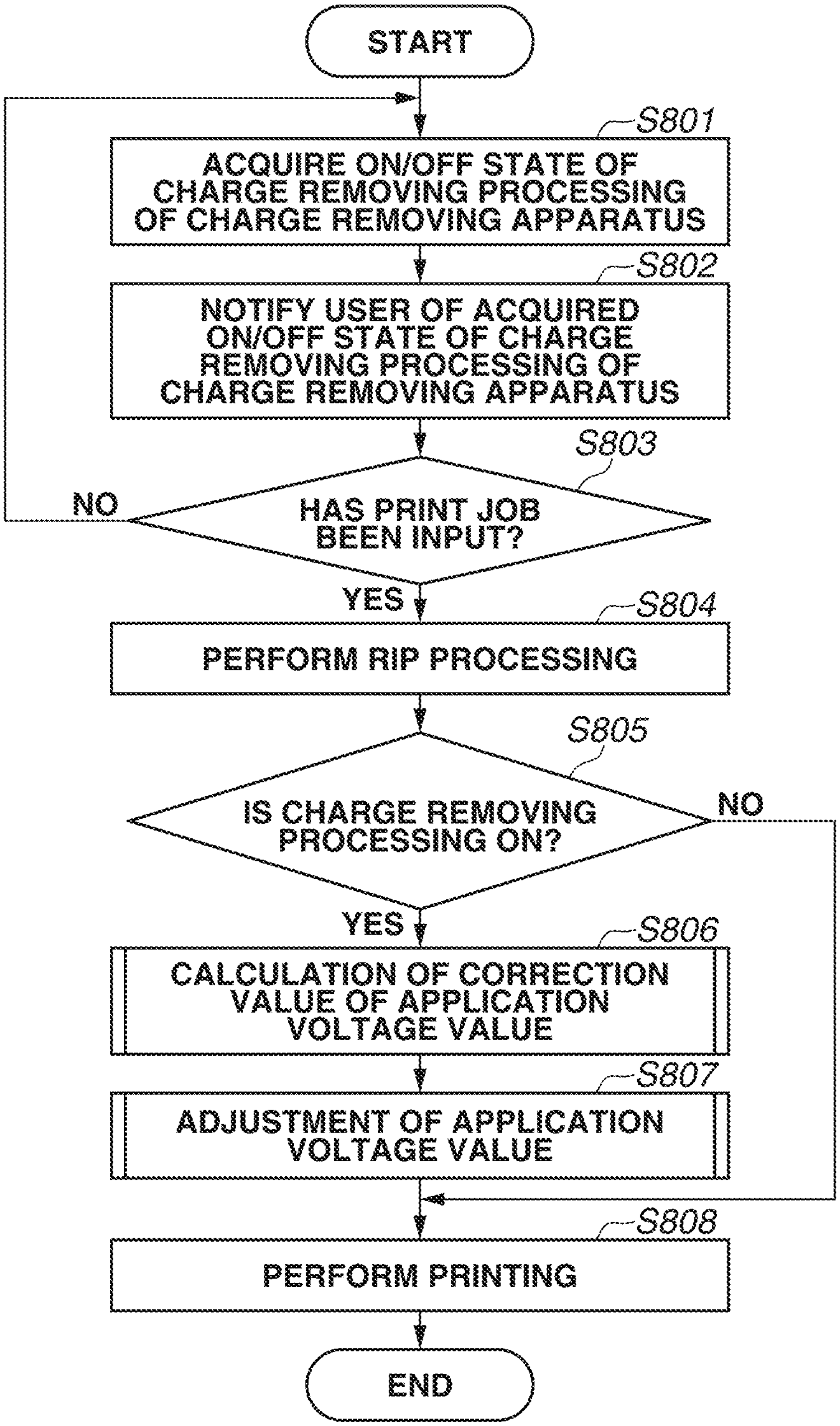
FIG. 8 is a basic flowchart according to an exemplary embodiment.

After completion of step S1003, the control unit 205 returns the processing to step after step S806 in FIG. 8.

(Flow of Processing in FIG. 8)

In the present exemplary embodiment, in steps S804 to S806, the flow of processing in which the control unit 205 of the printing apparatus 100 calculates the correction value of the application voltage value for the image data after RIP is described; however, the processing may be performed by the client computer 102 before the data is input. In this case, the client computer 102 inputs the application voltage value (or the correction value of the application voltage value) as a sheet parameter together with the PDL data to be input. Then, the control unit 205 stores the application voltage value as the sheet parameter in the HDD 209 when receiving the print job. In this case, the control unit 205 does not perform the processing in step S806, and the processing may proceed to subsequent step S807 by using the received application voltage value.

Subsequently, in step S807, the control unit 205 adjusts the application voltage value by using the toner use amount coefficient 950 determined in step S806.

(Adjustment of Application Voltage Value: Step S807)

Figure 11:
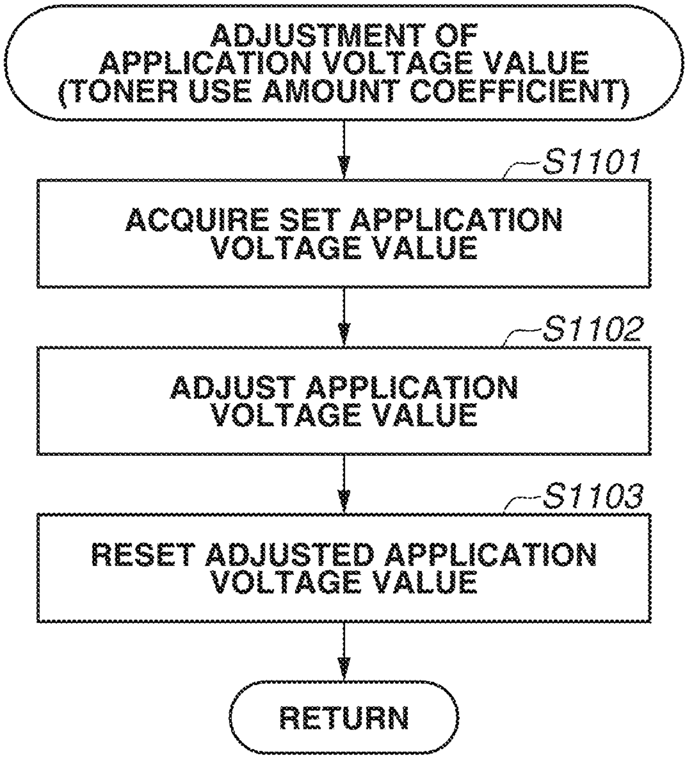
FIG. 11 is a flowchart for determining an adjusted application voltage value according to the exemplary embodiment.

The processing in step S807 is described with reference to the flowchart in FIG. 11. The processing in step S807 is processing for adjusting the application voltage value preset in the printing apparatus 100 by using the toner use amount coefficient 950 to determine an application voltage value optimum for the received print job.

In step S1101, the control unit 205 acquires, from the control unit 501, the application voltage value in the sheet parameter set for each sheet type of print job in the charge removing apparatus 200-3*a*.

In the present exemplary embodiment, the acquired application voltage value is assumed to be +3 [kV].

In step S1102, the control unit 205 adjusts the application voltage value for the image 900 from the toner use amount coefficient 950 determined in step S806, based on the acquired application voltage value. For an adjustment, a charge amount (an application voltage value set in the sheet parameter) of a blank sheet (without toner) of the sheet type and a charge amount of an entire surface solid image of (C, M, Y, K)=(255, 255, 255, 255) are measured in advance. An adjusted application voltage value is calculated by multiplying a charge amount difference therebetween by the toner use amount coefficient.

As an example, a case where the charge amount of the blank sheet is −1.0 [kV] and the charge amount of the entire surface solid image is −7.0 [kV] is described below.

The case indicates that a toner layer is charged at a maximum of −6.0 [kV]. Thus, the application voltage value for offsetting the charge amount is determined in an application voltage value adjustment based on the toner use amount.

In the present exemplary embodiment, since the toner use amount coefficient 950 is 67.5%, the charge amount of the image 900 is estimated to be (−1.0)+(−6.0×0.675)=−5.1 [kV]. To offset the charge amount, the control unit 205 sets the application voltage value of +5.1 [kV] to the charge removing processing unit 503 via the control unit 501.

In step S1103, the control unit 205 resets the application voltage value calculated in step S1102 to the charge removing processing unit 503 via the control unit 501 of the charge removing apparatus 200-3*a*.

In the present exemplary embodiment, in step S1102, the processing for adjusting the application voltage value by deriving the coefficient while the coefficient in the case where the toner is applied to the entire surface of the sheet is defined as 100% is described. However, depending on the sheet, the necessary application voltage value is not always proportional to the toner use amount. In this case, the application voltage value may be adjusted in a stepwise manner based on sheet characteristics.

In a stepwise adjustment of the application voltage value, for example, the adjustment may be unnecessary when the toner use amount coefficient is 70 or less, the application voltage value may be set to +1 [kV] when the toner use amount coefficient is 71 to 90, and the application voltage value may be set to +2 [kV] when the toner use amount coefficient is 91 to 100.

After completion of step S1103, the control unit 205 returns the processing to step after step S807 in FIG. 8.

(Flow of Processing in FIG. 8)

In step S808, the control unit 205 of the printing apparatus 100 performs the print processing in the printing apparatus 100, and performs the charge removing processing using the application voltage value adjusted in step S807 in the charge removing apparatus 200-3*a*. Then, the processing ends.

As described above, the application voltage value of the charge removing apparatus 200-3*a* can be controlled based on the toner use amount used for the sheet to be printed. The application voltage value suitable for an image to be actually printed by the user is settable. This makes it possible to provide a high-quality result document without causing sticking of discharged sheets.

Further, in the image forming apparatus 1000, for example, a message "an adjustment of the charge removing voltage value for each page is enabled" or the like may be displayed on the operation unit 204, and a switch for switching between enabling and disabling the adjustment according to the present exemplary embodiment may be provided.

In the first exemplary embodiment, the toner use amount for the image 900 of the input print job is calculated from the RIP image by using the toner use amount table, and the toner use amount coefficient is derived. Then, the application voltage value optimum for the input print job is derived by incorporating the coefficient into the preset application voltage value. In a second exemplary embodiment, a method is described where, for the image 900 of the input print job, not the toner use amount but an area of a region where the toner is used, namely, an area of a non-background region is calculated, and a coefficient thereof is calculated. Then, an example is described where the application voltage value optimum for the input print job is derived by multiplying the preset application voltage value by the coefficient. The contents illustrated in FIG. 1 to FIG. 7 according to the first exemplary embodiment also apply to the second exemplary embodiment. Therefore, descriptions of the contents are omitted.

Print Processing and Charge Removing Processing

Print processing and charge removing processing according to the second exemplary embodiment are described with reference to FIG. 8. Processing described below is implemented by the control unit 205 that is the CPU of the printing apparatus 100 loading a program stored in the ROM 207 or the HDD 209 into the RAM 208 and executing the program.

In FIG. 8, steps S801 to S805 and S808 are similar to steps in the first exemplary embodiment. Thus, descriptions of these steps are omitted. For illustrative purposes, a flow of processing for performing the print processing and the charge removing processing is described by using an image 1200 illustrated in FIG. 12 as an example of the received print job. The image 1200 is A4-size data.

Figure 13:
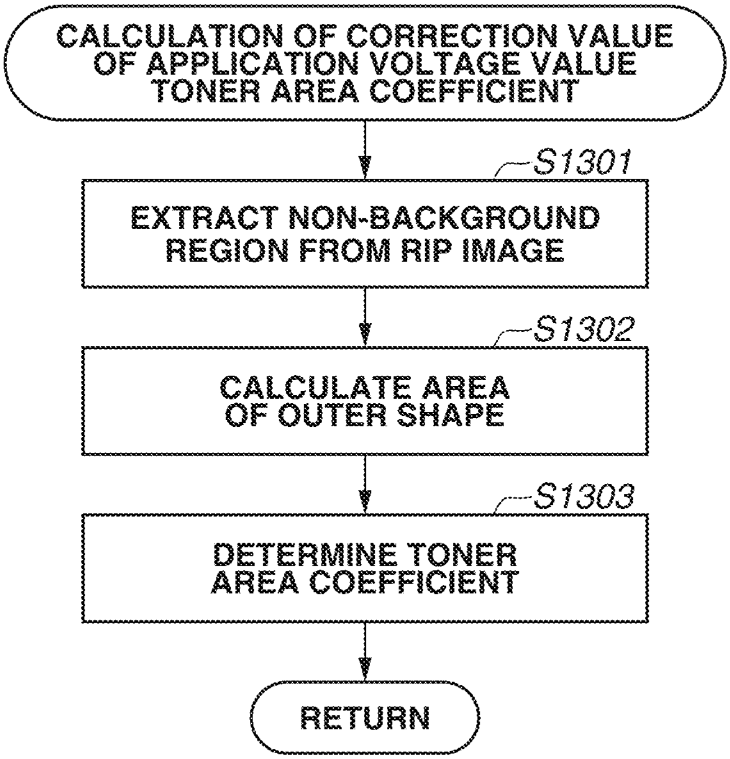
FIG. 13 is a flowchart for determining a toner area coefficient according to the second exemplary embodiment.

The processing in step S806 is described with reference to the flowchart in FIG. 13. The processing in step S806 is processing for calculating an area of a region where the toner is used, from the image data, and determining a coefficient to obtain an application voltage value suitable for the calculated area, in order to derive the application voltage value optimum for the received image data.

(Calculation of Correction Value of Application Voltage Value: Step S806)

Figure 12:
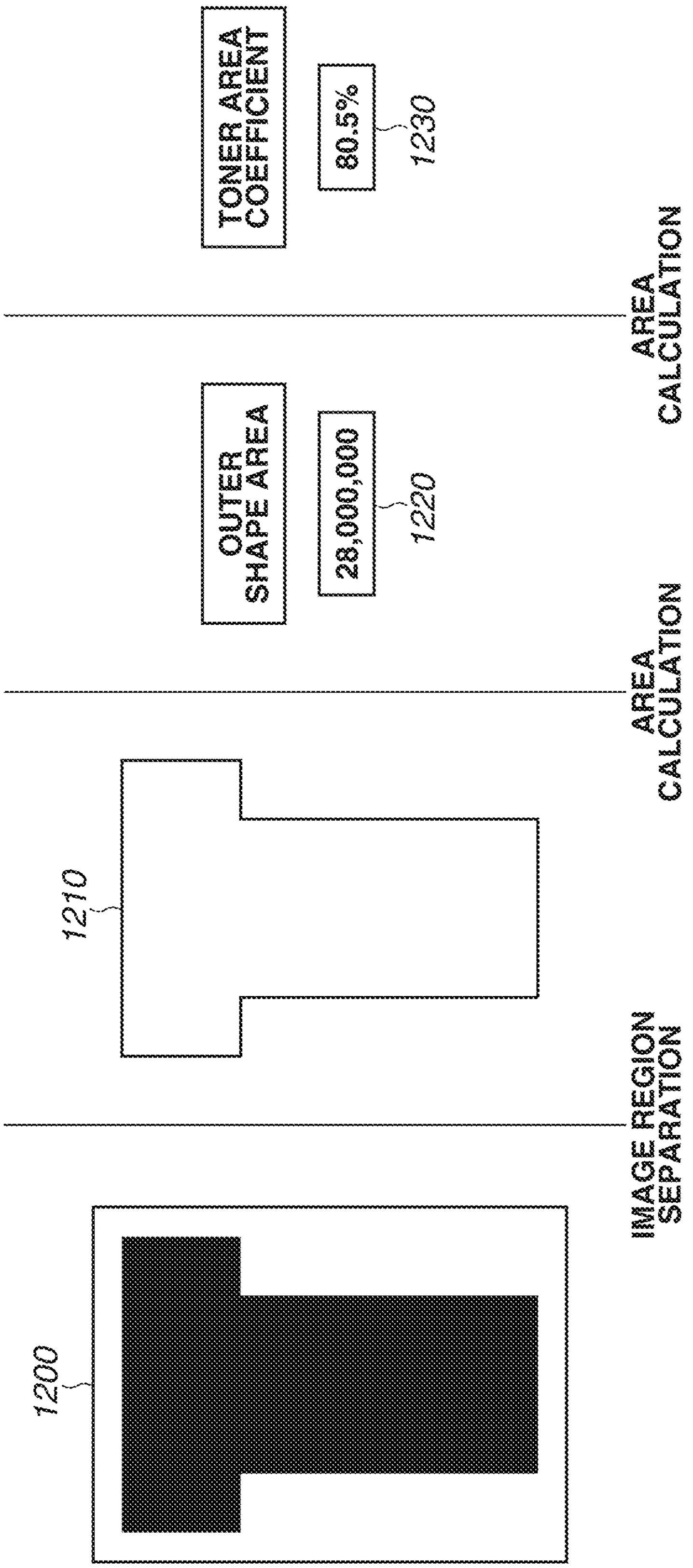
FIG. 12 illustrates an example of a print job for supplementation of a second exemplary embodiment.

In step S1301, the control unit 205 extracts a non-background region from the RIP image created in step S804. An outer shape image 1210 illustrated in FIG. 12 is an image of a non-background region extracted from the image 1200 by image region separation.

In step S1302, the control unit 205 calculates an area of the outer shape image 1210. It is assumed that the calculated area is 28,000,000. In a case where an outer shape is complicated, the area may be calculated by approximating the outer shape to a rectangular shape.

In step S1303, the control unit 205 determines a toner area coefficient 1230 from an area ratio of a sheet and the outer shape image 1210.

Since the sheet size of the image 1200 is A4, the sheet area is 4960×7015=34,794,400. Thus, a toner area coefficient 1230 according to the present exemplary embodiment is 28,000,000/34,794,400×100=80.5%.

After completion of step S1303, the control unit 205 returns the processing to step after step S806 in FIG. 8.

(Flow of Processing in FIG. 8)

In step S807, the control unit 205 adjusts the application voltage value by using the toner area coefficient determined in step S806.

(Adjustment of Application Voltage Value: Step S807)

Figure 14:
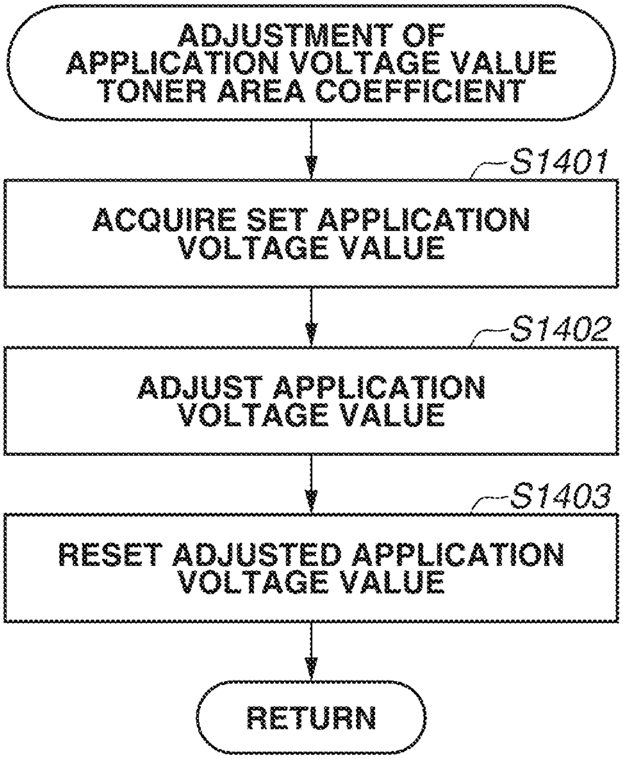
FIG. 14 is a flowchart for determining an adjusted application voltage value according to the second exemplary embodiment.

The processing in step S807 is described with reference to the flowchart in FIG. 14. The processing in step S807 is processing for adjusting the application voltage value preset in the printing apparatus 100 by using the toner area coefficient to determine an application voltage value optimum for the received print job.

In step S1401, the control unit 205 acquires, from the control unit 501, the application voltage value set in the charge removing processing unit 503. In the present exemplary embodiment, the acquired application voltage value is assumed to be +3 [kV].

In step S1402, the control unit 205 adjusts the application voltage value for the image 1200 from the toner area coefficient 1230 determined in step S806, based on the acquired application voltage value. For an adjustment, a charge amount (an application voltage value set in the sheet parameter) of a blank sheet (without toner) of the sheet type and a charge amount of an entire surface solid image of (C, M, Y, K)=(255, 255, 255, 255) are measured in advance. An adjusted application voltage value is calculated by multiplying a charge amount difference therebetween by the toner area coefficient.

For example, a case where the charge amount of the blank sheet is −1.0 [kV] and the charge amount of the entire surface solid image is −7.0 [kV] is described below. The case indicates that a toner layer is charged at a maximum of −6.0 [kV]. Thus, the application voltage value for offsetting the charge amount is determined in an application voltage value adjustment based on the toner area.

In the present exemplary embodiment, since the toner area coefficient 1230 calculated in step S1303 is 80.5%, the charge amount of the image 1200 is estimated to be (−1.0)+(−6.0×0.805)=−5.8 [kV]. To offset the charge amount, the control unit 205 sets the application voltage value of +5.8 [kV] to the charge removing processing unit 503 via the control unit 501.

In step S1403, the control unit 205 resets the application voltage value calculated in step S1402 to the charge removing processing unit 503 via the control unit 501 of the charge removing apparatus 200-3*a*.

After completion of step S1403, the control unit 205 returns the processing to the step after step S807 in FIG. 8.

In the present exemplary embodiment, in step S1402, the processing for adjusting the application voltage value by deriving the coefficient while the coefficient in the case where the toner is applied to the entire surface of the sheet is defined as 100% is described. However, depending on the sheet, the necessary application voltage value is not always proportional to the toner area. In this case, the application voltage value may be adjusted in a stepwise manner based on sheet characteristics.

In a stepwise adjustment of the application voltage value, for example, the adjustment may be unnecessary when the toner area coefficient is 70 or less, the application voltage value may be set to +1 [kV] when the toner area coefficient is 71 to 90, and the application voltage value may be set to +2 [kV] when the toner area coefficient is 91 to 100.

As described above, the application voltage value of the charge removing apparatus 200-3*a* can be controlled based on the toner area of the toner used for the sheet to be printed. The application voltage value corresponding to the image actually printed by the user is settable. This makes it possible to provide a high-quality result document without generating sticking of discharged sheets.

Further, in the image forming apparatus 1000, for example, a message "an adjustment of the charge removing voltage value for each page is enabled" or the like may be displayed on the operation unit 204, and a switch for switching between enabling and disabling the adjustment according to the present exemplary embodiment may be provided.

In the first exemplary embodiment and the second exemplary embodiment, the application voltage value optimum for the image 900 or 1200 of the input print job is calculated by multiplying the application voltage value set to the sheet type of the input print job, by the coefficient calculated based on the toner use amount or the area of the non-background region. In a third exemplary embodiment, the image of the input print job is first divided in a sub-scanning direction into bands each having a predetermined width, and an application voltage value using the coefficient calculated based on the toner use amount or the area of the non-background region is calculated for each of the bands. Then, an example is described where charge removing by the charge removing roller is performed while the application voltage value is switched to one optimum for each of the bands. In the present exemplary embodiment, an example in which the application voltage value adjustment is performed using the coefficient corresponding to the toner use amount according to the first exemplary embodiment is described. The contents illustrated in FIG. 1 to FIG. 7 according to the first exemplary embodiment also apply to the third exemplary embodiment. Thus, descriptions of the contents are omitted.

Print Processing and Charge Removing Processing

Print processing and charge removing processing according to the third exemplary embodiment are described with reference to FIG. 16. Processing described below is implemented by the control unit 205 that is the CPU of the printing apparatus 100 loading a program stored in the ROM 207 or the HDD 209 into the RAM 208 and executing the program.

Figure 15:
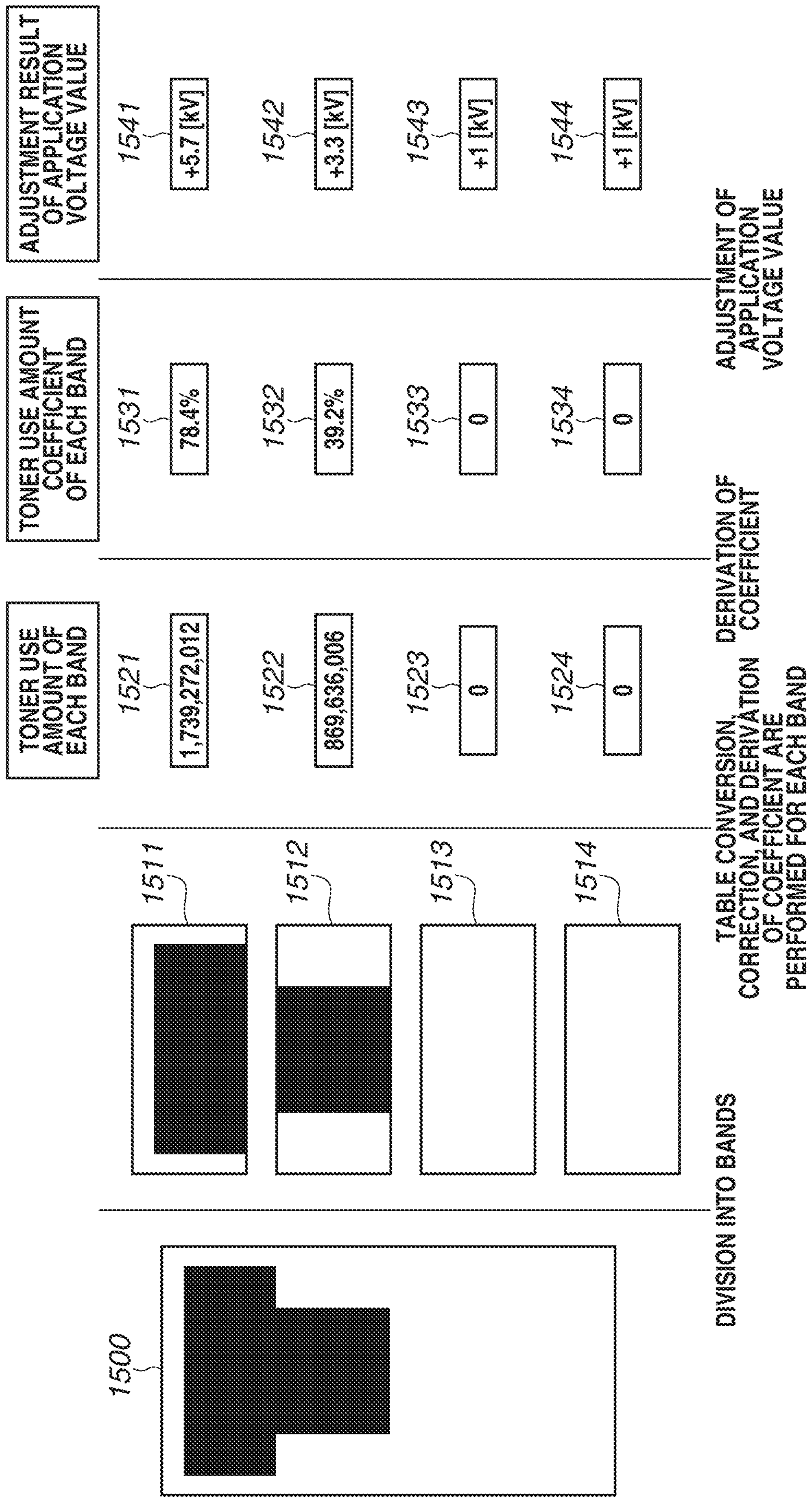
FIG. 15 illustrates an example of a print job for supplementation of a third exemplary embodiment.
Figure 16:
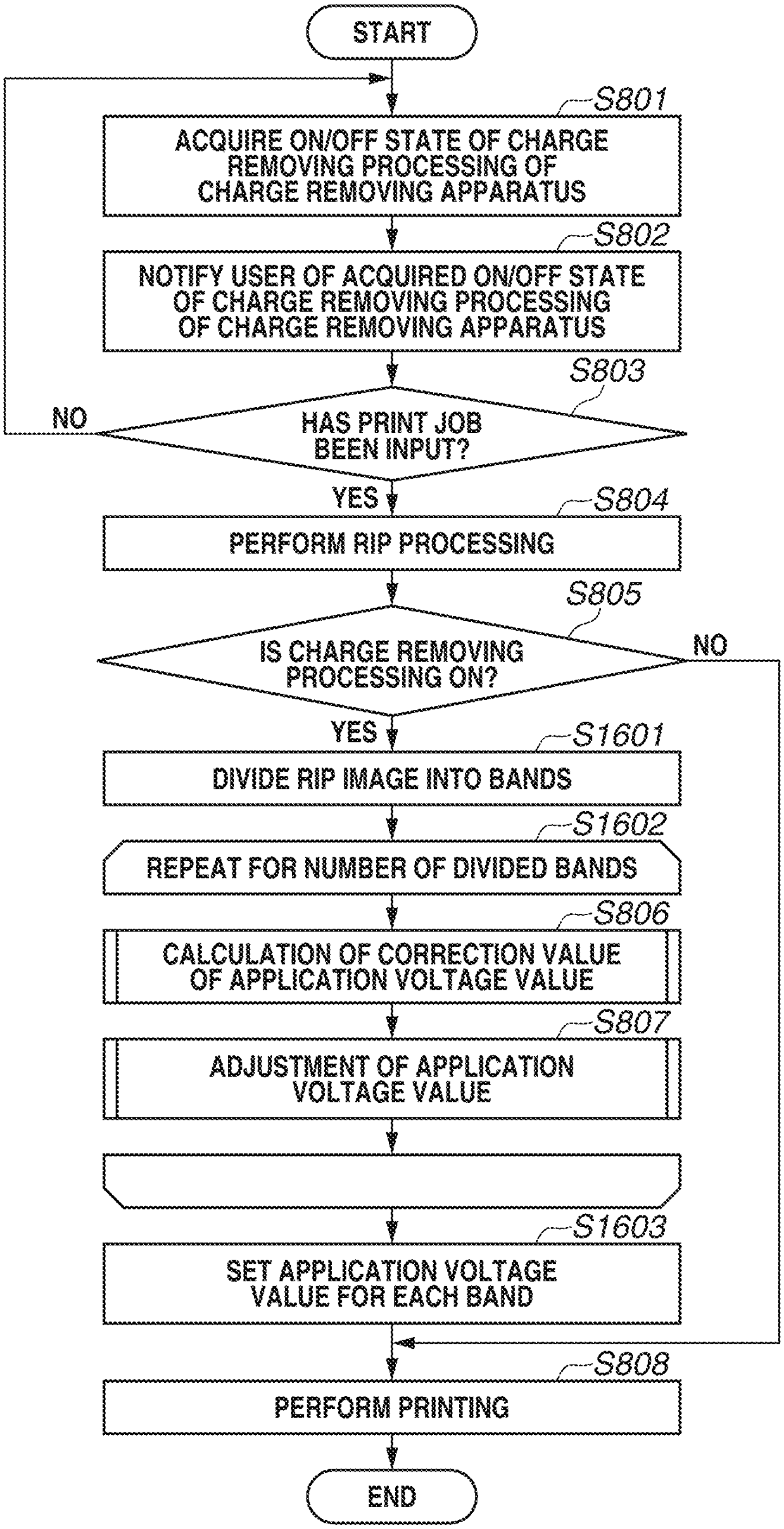
FIG. 16 is a basic flowchart according to the third exemplary embodiment.

In FIG. 16, steps S801 to S808 are similar to steps in the first exemplary embodiment. Thus, descriptions of steps are omitted. The flow of the processing is a flow of processing for dividing the image data after RIP of each page of the received print job into bands, calculating the toner use amount necessary for printing for each of the bands, and determining a coefficient to obtain the optimum application voltage value corresponding to the toner use amount. For illustrative purposes, a flow of processing for performing the print processing and the charge removing processing of the job is described by using an image 1500 illustrated in FIG. 15 as an example of the received print job. The image 1500 is A4-size data.

In step S1601, the control unit 205 divides the image 1500 at predetermined intervals in the sub-scanning direction. In the present exemplary embodiment, an example in which the image 1500 is divided into four bands 1511, 1512, 1513, and 1514 is described. Each of the bands is image data of 4960 pixels in a main scanning direction and 1754 (=7015/4) pixels in the sub-scanning direction.

As described in the first exemplary embodiment, in step S806, the control unit 205 determines the toner use amount coefficient as the correction value of the application voltage value for the image data on the band 1511. To do so, table conversion is performed using the toner use amount table, and a toner use amount 1521 and a toner use amount coefficient 1531 of the band 1511 are calculated from a sum of toner use amounts of the pixels. In the present exemplary embodiment, detailed description of the calculation method is omitted because the calculation method is similar to the calculation method according to the first exemplary embodiment. The toner use amount 1521 is calculated to be 1,739,272,012, and the toner use amount coefficient 1531 is calculated to be 78.4%. As described in the first exemplary embodiment, in step S807, the control unit 205 adjusts the application voltage value for the band 1511 by performing multiplication using the toner use amount coefficient 1531 determined in step S806 based on the currently-set application voltage value. For an adjustment, a charge amount (an application voltage value set in the sheet parameter) of a blank sheet (without toner) of the sheet type and a charge amount of an entire surface solid image of (C, M, Y, K)=(255, 255, 255, 255) are measured in advance. An adjusted application voltage value is calculated by multiplying a charge amount difference therebetween by the toner use amount coefficient. For example, in a case where the charge amount of the blank sheet is −1.0 [kV] and the charge amount of the entire surface solid image is −7.0 [kV], it is known that a toner layer is charged at a maximum of −6.0 [kV]. Thus, the application voltage value for offsetting the charge amount is determined in an application voltage value adjustment based on the toner use amount. In the present exemplary embodiment, since the toner use amount coefficient 1531 is 78.4%, the charge amount of the band 1511 is estimated to be (−1.0)+(−6.0×0.784)=−5.7 [kV]. To offset the charge amount, the control unit 205 sets the application voltage value of +5.7 [kV] to the charge removing processing unit 503 via the control unit 501.

The control unit 205 resets the application voltage value taking the adjusted value into consideration, to the charge removing processing unit 503 via the control unit 501 of the charge removing apparatus 200-3*a*. In the present exemplary embodiment, the application voltage value of +5.7 [kV], in which the adjustment result of +4.7 [kV] is taken into consideration, is set. In step S1602, the control unit 205 repeats the processing in steps S806 and S807 described above the number of times equal to the number of bands divided in step S1601. Although the detailed calculation is omitted because the calculation is similar to the calculation in the first exemplary embodiment, the toner use amount of each of the bands 1513 and 1514 is small, and thus the adjusted application voltage value is still +1 [kV] that is the original application voltage value.

In step S1603, the control unit 205 notifies the control unit 501 of the charge removing apparatus 200-3*a* of the application voltage value determined for each of the bands, and sets the application voltage value for each of the bands.

Finally, in step S808, the control unit 205 of the printing apparatus 100 performs the print processing in the printing apparatus 100.

When, in the charge removing apparatus 200-3*a*, the charge removing processing is performed using the application voltage value adjusted in step S807, the charge removing processing unit 503 instructs a charge removing roller to perform the charge removing processing using the application voltage value different for each of the bands set by the control unit 501. The processing then ends.

In the present exemplary embodiment, the control unit 501 changes the application voltage value of the charge removing roller via the charge removing processing unit 503 in the middle of the charge removing processing of one sheet, thereby applying different voltages to different regions of one sheet. As a result, as compared with a case where a uniform application voltage is applied to the entire sheet, it is possible to offset the charge amount on the toner layer in each of the bands, and to achieve a higher charge removing effect. This makes it possible to provide a suitable result document to the user without causing sticking of discharged sheets.

In the present exemplary embodiment, the example in which the image is divided into four bands is described; however, the number of bands can be increased or decreased depending on voltage application performance of the charge removing roller.

Further, in the image forming apparatus 1000, for example, a message "an adjustment of the charge removing voltage value for each band is enabled" or the like may be displayed on the operation unit 204, and a switch for switching between enabling and disabling the adjustment according to the present exemplary embodiment may be provided.

The case where the image forming apparatus receives the print job from the client computer is described above. In addition, in a case of performing copy processing using the scanner unit 201 of the image forming apparatus and in a case of receiving a facsimile (FAX) using a FAX function (not illustrated), the application voltage for the charge removing processing can be adjusted from the image data.

Further, the charge amount is measured with a sensor or the like, and the calculated charge amount and the actual charge amount are compared and fed back, which makes it possible to perform the charge removing processing with higher accuracy.

Moreover, environmental parameters, such as humidity and air temperature, are measured with a sensor or the like, and the information is fed back, which makes it possible to perform the charge removing processing with higher accuracy.

Other Embodiments

Embodiment(s) of the present disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has described exemplary embodiments, it is to be understood that some embodiments are not limited to the disclosed exemplary embodiments. The scope of the following claims is to be accorded the broadest interpretation so as to encompass all such modifications and equivalent structures and functions.

This application claims priority to Japanese Patent Application No. 2023-112823, which was filed on Jul. 10, 2023 and which is hereby incorporated by reference herein in its entirety.

What is claimed is:

1. An image forming apparatus comprising:

a printer that performs print processing on a sheet based on a job;

a controller that specifies a charge amount from pixel values of image data on a page of the job; and a charge remover that performs charge removing processing of the sheet based on the charge amount specified by the controller, wherein the pixel values range from 0 to 255 for cyan, magenta, yellow, or black.

2. The image forming apparatus according to claim 1, further comprising:

one or more memories storing instructions; and one or more processors, wherein execution of the instructions causes the one or more processors to adjust a voltage value applied to the charge remover in a stepwise manner based on sheet characteristics, from a charge amount of a blank sheet, a charge amount of an all-pixel toner solid image, and a toner use amount of the image data on the page, for a same sheet type as a sheet type of the sheet.

3. The image forming apparatus according to claim 1, wherein the charge amount is calculated from a charge amount of a blank sheet, a charge amount of an all-pixel toner solid image, and an area where toner is used in the image data on the page, for a same sheet type as a sheet type of the sheet.

4. The image forming apparatus according to claim 1, further comprising:

one or more memories storing instructions; and one or more processors, wherein execution of the instructions causes the one or more processors to divide the image data on the page of the job into bands each having a predetermined width, and to adjust a voltage value applied to the charge remover in a charge removing apparatus based on a respective charge amount calculated for each of the bands.

5. The image forming apparatus according to claim 1, wherein the controller:

determines a first application voltage value corresponding to a sheet type the sheet;

adjusts the first application voltage value to a second application voltage value based on the charge amount; and sets the second application voltage value for the charge removing processing.

6. A method of controlling an image forming apparatus, the method comprising:

performing print processing on a sheet based on a job;

specifying a charge amount from pixel values of image data on a page of the job; and performing charge removing processing of the sheet based on the charge amount, where in the pixel values range from 0 to 255 for cyan, magenta, yellow, or black.

7. A non-transitory computer-readable storage medium storing computer-executable instructions for causing a computer to execute a method of controlling an image forming apparatus, the method comprising:

performing print processing on a sheet based on a job;

specifying a charge amount from pixel values of image data on a page of the job; and performing charge removing processing of the sheet based on the charge amount, where in the pixel values range from 0 to 255 for cyan, magenta, yellow, or black.

* * * * *